United States Patent
Okumura et al.

(10) Patent No.: US 11,590,944 B2
(45) Date of Patent: Feb. 28, 2023

(54) BRAKING CONTROL DEVICE

(71) Applicant: TOYOTA JIDOSHA KABUSHIKI KAISHA, Toyota (JP)

(72) Inventors: Kazuya Okumura, Mishima (JP); Hideki Kubonoya, Toyota (JP); Yusuke Suzuki, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 280 days.

(21) Appl. No.: 17/022,615

(22) Filed: Sep. 16, 2020

(65) Prior Publication Data
US 2021/0122341 A1   Apr. 29, 2021

(30) Foreign Application Priority Data

Oct. 23, 2019   (JP) .............................. JP2019-192471

(51) Int. Cl.
| | |
|---|---|
| *B60T 8/1761* | (2006.01) |
| *B60T 8/172* | (2006.01) |
| *B60T 8/24* | (2006.01) |
| *B60T 8/72* | (2006.01) |

(52) U.S. Cl.
CPC ............ *B60T 8/1761* (2013.01); *B60T 8/172* (2013.01); *B60T 8/246* (2013.01); *B60T 8/72* (2013.01); *B60T 2250/04* (2013.01); *B60T 2270/611* (2013.01)

(58) Field of Classification Search
CPC ........ B60T 8/1761; B60T 8/172; B60T 8/246; B60T 8/72; B60T 2250/04; B60T 2270/611
USPC ........................................................... 701/70
See application file for complete search history.

(56) References Cited

U.S. PATENT DOCUMENTS

| | | | |
|---|---|---|---|
| 5,437,586 A | | 8/1995 | Kashiwagi |
| 5,471,390 A | * | 11/1995 | Sasaki ..................... B60T 8/175 |
| | | | 303/DIG. 6 |
| 2006/0124374 A1 | | 6/2006 | Katada et al. |

(Continued)

FOREIGN PATENT DOCUMENTS

| | | |
|---|---|---|
| DE | 44 26 063 A1 | 1/1995 |
| JP | 8-282462 A | 10/1996 |
| JP | 2000-118376 A | 4/2000 |

(Continued)

OTHER PUBLICATIONS

English Translation for JP2014073709A (Year: 2022).*

*Primary Examiner* — Mahmoud S Ismail
(74) *Attorney, Agent, or Firm* — Sughrue Mion, PLLC (57) ABSTRACT

A braking control device of a vehicle in which a braking force generator is connected to a differential mechanism to which a plurality of wheels is connected, and a friction brake is provided for each of the wheels includes a controller configured to control braking forces of the braking force generator and the friction brake. The controller is configured to: detect the wheel having a tendency of locking in which a slip ratio is larger than a predetermined determination value in a state where the braking force is transmitted to each of the wheels from the braking force generator via the differential mechanism; and reduce the tendency of locking by changing the braking force of the friction brake that is provided for the other wheel connected to the differential mechanism.

13 Claims, 7 Drawing Sheets

(56) References Cited

U.S. PATENT DOCUMENTS

2016/0214486 A1   7/2016   Suzuki
2021/0086623 A1 * 3/2021   Yao .................. B60W 30/18172

FOREIGN PATENT DOCUMENTS

| | | | |
|---|---|---|---|
| JP | 2000-166004 A | | 6/2000 |
| JP | 2011061945 A | | 3/2011 |
| JP | 2014073709 A | * | 4/2014 |
| JP | 2014-079099 A | | 5/2014 |
| JP | 2015-66996 A | | 4/2015 |
| KR | 1020070018706 A | | 2/2007 |

* cited by examiner

FIG. 7
(COMPARATIVE EXAMPLE)

FIG. 8

BRAKING CONTROL DEVICE

INCORPORATION BY REFERENCE

The disclosure of Japanese Patent Application No. 2019-192471 filed on Oct. 23, 2019 including the specification, drawings and abstract is incorporated herein by reference in its entirety.

BACKGROUND

1. Technical Field

The present disclosure relates to a braking control device that controls a braking force or a braking device that decelerates a vehicle, and in particular, relates to a braking control device that controls a braking force of wheels that are connected to each other via a differential mechanism.

2. Description of Related Art

A driving force source such as an engine mounted on a vehicle outputs torque by power conversion, and also generates negative torque that accompanies conversion of an external force into a pressure, a heat, and/or an electric power, when the driving force source is rotated by the external force. The state where the vehicle is braked using the negative torque is an engine brake (power source brake) state or a regenerative brake state. A hybrid vehicle includes an internal combustion engine such as a gasoline engine and a motor with a power generating function (motor-generator) as a driving force source that can function as described above. Therefore, in the hybrid vehicle, the internal combustion engine and the motor can be used for braking the vehicle. In that case, responsiveness of torque control of the motor is superior to that of the internal combustion engine. Therefore, it is advantageous to control the braking force by controlling regenerative torque of the motor.

Japanese Unexamined Patent Application Publication No. 2014-079099 (JP 2014-079099 A) describes a braking device that concurrently uses a regenerative brake and a friction brake. The regenerative brake uses, as the braking force, regenerative torque resulted from power generation of the motor. The friction brake is provided for each wheel. The braking device described in JP 2014-079099 A is a device that is applied to a vehicle in which the motor and a friction-type brake device are provided for each wheel. When a braking request is made by depressing a brake pedal or returning an accelerator pedal from the depressed state, the device above calculates a brake command value based on the braking request and controls a regenerative braking force by the motor and a friction braking force by the brake device based on the calculated braking command value. As described above, the braking device detects a slip ratio when the braking force is applied to the wheel and determines a tendency of locking of the wheel based on the slip ratio. The braking device then controls the regenerative braking force to be applied to the wheel having the tendency of locking to be a braking force that is smaller than the braking force determined based on the braking command value and that does not lock the wheel. Therefore, in the disclosure described in JP 2014-079099 A, because a control responsiveness of the regenerative braking force is high, it is possible to preferably avoid or suppress the tendency of locking of the wheel.

SUMMARY

The slip ratio and the tendency of locking of the vehicle wheels change time to time depending on the condition of a road surface on which the vehicle is traveling. Therefore, when the tendency of locking of the wheel is determined, the braking device described in JP 2014-079099 A controls, of the regenerative braking force and the friction braking force that act on the wheel, the regenerative braking force having high control responsiveness to avoid or suppress the wheel to have the tendency of locking. The braking force can be maintained by changing the regenerative braking force above because the braking force to be applied to other wheels does not change even when the regenerative braking force to be applied to a certain wheel is changed. This is as described in JP 2014-079099 A. In a vehicle in which the motor is connected to the right and left wheels via the differential mechanism, the driving force or the braking force generated by the motor is split and distributed to the right and left wheels by the differential mechanism. Therefore, when the braking force or the slip ratio of one of the right and left wheels is changed, the braking force or the slip ratio of the other wheel is also changed in accordance with the change. Therefore, the braking device described in JP 2014-079099 A cannot be used for a vehicle configured such that regenerative braking is performed via the differential mechanism. In other words, for a vehicle in which the regenerative torque is transmitted to the right and left wheels via the differential mechanism and the wheels are braked by both of regenerative braking and frictional braking, there is a need for developing a new technology that is not included in the related art to control the slip ratio or the tendency of locking of the wheel using the regenerative braking force.

The present disclosure provides a braking device that, for a vehicle in which a braking force generator that generates negative torque for braking is connected to at least two wheels via the differential mechanism, brakes the wheels using the negative torque generated by the braking force generator and can preferably control the slip ratio of the wheels while changing the negative torque, which can achieve reduction of a braking distance.

An aspect of the present disclosure provides a braking control device of a vehicle in which a braking force generator that generates a braking force that acts in a direction to reduce a rotation of a plurality of wheels is connected to a differential mechanism to which the plurality of wheels is connected, and a friction brake that generates a braking force that acts in a direction to stop the rotation of the wheels through friction is provided for each of the wheels. The braking control device includes a controller configured to control the braking force that is generated by the braking force generator and the braking force that is generated by the friction brake. The controller is configured to detect the wheel having a tendency of locking in which a slip ratio is larger than a predetermined determination value in a state where the braking force is transmitted to each of the wheels from the braking force generator via the differential mechanism, and reduce the tendency of locking by changing the braking force of the friction brake that is provided for the other wheel connected to the differential mechanism to which the wheel having the tendency of locking is connected.

In the aspect above, the controller may be configured to obtain a target wheel rotational speed of the other wheel, and control the braking force applied to the other wheel by the friction brake that is provided for the other wheel such that a rotational speed of the other wheel matches the target wheel rotational speed.

In the aspect above, when the vehicle is making a turn, the target wheel rotational speed may be a rotational speed including a value that is a half of a right and left wheel speed difference obtained based on a steering angle and a vehicle speed of the vehicle.

In the aspect above, the target wheel rotational speed of the other wheel may be a rotational speed at which the slip ratio of the other wheel takes a value within a predetermined range In the aspect above, the braking force generator may be an energy regenerator that generates negative torque by regenerating an energy as the braking force In the aspect above, the controller may be configured to obtain, when a deceleration request is made, a base friction braking force that is required to be generated by the friction brake by subtracting a predetermined base braking force to be generated by the braking force generator from a required deceleration of the deceleration request, obtain a target rotational speed of the braking force generator that corresponds to a target wheel speed during braking based on the deceleration request, and correct the base braking force such that a rotational speed of the braking force generator matches the target rotational speed In the aspect above, the controller may be configured to control, when a wheel speed of one of the wheels connected to the differential mechanism increases in excess by a predetermined value or more from a wheel speed that corresponds to a target wheel rotational speed in accordance with the correction of the base braking force, the braking force of the friction brake that is provided for the one of the wheels such that the wheel speed of the one of the wheels matches a wheel speed that corresponds to the target wheel rotational speed.

According to the above aspect, when a braking request is made, the braking force generator that is connected to the wheels via the differential mechanism generates the braking force, or in addition to this, the friction brake that is provided for each wheel generates the braking force. The braking force as the entire vehicle in the case above is controlled by changing the braking force generated by the braking force generator in accordance with the rotational speed and the slip ratio of the wheels. When the rotational speed (wheel speed) of any one of the wheels decreases due to a decrease of the friction coefficient of the road surface, that is, when the wheel has the tendency of locking, the braking force generated by the braking force generator mechanism does not act on the other wheel that is connected to the differential mechanism to which the wheel having the tendency of locking is connected due to the differential action of the differential mechanism. When the tendency of locking is detected, the braking force of the friction brake provided for the other wheel is changed (more specifically, the braking force is increased). As a result, the braking force that is generated by the braking force generator and acts on the wheel having the slip ratio that increases, which reduces or eliminates the tendency of locking. The braking force by the friction brake may be controlled such that the rotational speed of the other wheel matches the target wheel rotational speed. That is, when any of the wheels has the tendency of locking, the braking control device of the present disclosure applies braking to the wheel other than the wheel having the tendency of locking using the frictional brake. As a result, a state similar to the state where differential limitation is imposed on the differential mechanism arises and the braking force that is generated by the braking force generator and is applied to the wheel of which tendency of locking is determined is reduced, which increases the rotational speed of the wheel. That is, the tendency of locking is corrected. In addition, the entire braking force of the other wheel increases, the rotational speed of the other wheel is controlled to match the target wheel rotational speed, and the friction coefficient of the other wheel approaches the maximum value. As a result, the wheel speed or the slip ratio of each wheel connected to the differential mechanism is controlled such that the friction coefficient increases. Therefore, the braking performance of the entire vehicle is improved. In other words, the braking distance can be shortened.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A vehicle according to an embodiment of the present disclosure can recover (regenerate) a kinetic energy by converting the kinetic energy into an electric power, etc., and can cause torque when regenerating the energy to act on wheels as a braking force. In particular, in the vehicle, a motor or a motor-generator (hereinafter collectively referred to as a "motor") is connected to a differential gear (differential mechanism), and right and left wheels are connected to the differential gear. Further, each wheel may be provided with a brake mechanism, such as a friction brake mechanism, that performs braking different from regenerative braking, and may be configured to perform braking of the vehicle using both of regenerative braking and friction braking.

Figure 1:
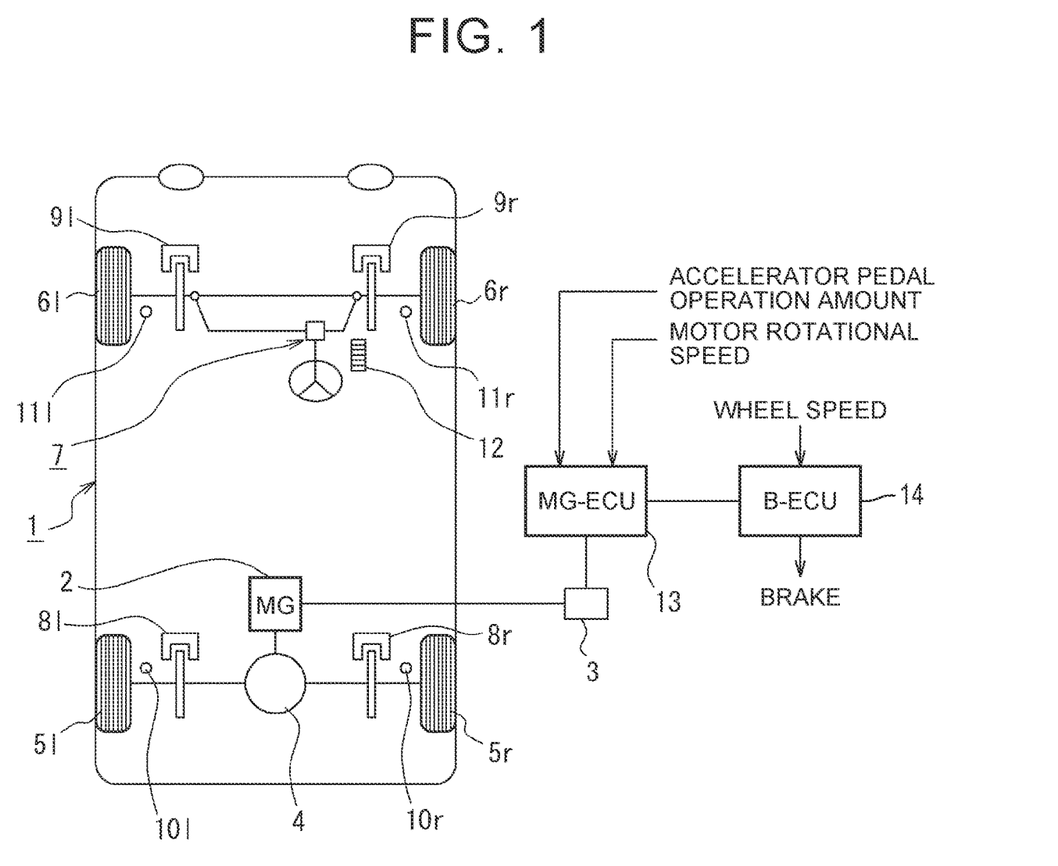
FIG. 1 is a diagram schematically showing a vehicle to which a braking control device of the present disclosure can be applied.

FIG. 1 schematically shows a vehicle of this type. A vehicle 1 shown in FIG. 1 is an electric vehicle that uses a motor (MG) 2 as a driving force source. The motor 2 is, for example, a permanent magnet type synchronous motor. The motor 2 is configured to generate driving torque when electric power is supplied to the motor 2, and generate electric power as the motor 2 is forcibly rotated by a traveling inertia force of the vehicle 1, for example. Negative torque resulted from the power generation above is a braking force (braking torque) of the vehicle 1.

The motor 2 is connected to a power supply device 3. The power supply device 3 includes a power storage device that supplies electric power to the motor 2 and stores the electric power generated by the motor 2, and an inverter that converts voltage or frequency, etc.

An output shaft (rotor shaft) of the motor 2 is connected to a differential gear (differential mechanism) 4 that is a final reduction gear. Right and left paired wheels (drive wheels) 5r, 5l are connected to the differential gear 4, and the differential gear 4 absorbs a difference in rotational speeds of the right and left wheels 5r, 5l. In the example shown in FIG. 1, the right and left wheels 5r, 5l are rear wheels. Right and left front wheels 6r, 6l are steering wheels, and a steering mechanism 7 is connected thereto. Therefore, the motor 2 corresponds to a braking force generator or an energy regenerator in the embodiment of the present disclosure.

Brakes 8r, 8l, 9r, 9l are provided on the front and rear wheels 5r, 5l, 6r, 6l, respectively. The brakes 8r to 9l are the same as the brake mechanism of the related art, and are friction brakes such as disc brakes, drum brakes, and powder brakes. The brakes 8r to 9l are configured to generate a braking force that acts in a direction to stop rotations of the wheels 5r to 6l by generating a friction force using a hydraulic pressure and an electromagnetic force. The brakes 8r to 9l correspond to friction brakes in the embodiment of the present disclosure. In addition, the front and rear wheels 5r to 6l are provided with sensors 10r, 10l, 11r, 11l, respectively, for detecting rotational speeds (wheel speeds) of the respective wheels.

The vehicle 1 includes a pedal 12 for performing acceleration and deceleration operations. The pedal 12 may consist of two pedals, namely an accelerator pedal and a brake pedal. However, in the example shown in FIG. 1, the pedal 12 is a so-called one-pedal type acceleration and deceleration device that is configured to perform acceleration and braking by the accelerator pedal. This type of one-pedal type acceleration and deceleration device may be a device having a configuration similar to that of the device of the related art. The acceleration and deceleration device is configured to, while the vehicle is traveling, calculate a reference depression angle based on a vehicle speed and a depression angle or a duration of a predetermined depression angle, and determine that an acceleration request is made based on the calculated angle when the pedal 12 is depressed and control acceleration or a driving force, and on the contrary, determine that a deceleration request is made when the pedal 12 returns from the depression angle above and control the braking force.

An electronic control unit (MG-ECU) 13 that controls the braking force and a regenerative braking force (regenerative brake) by the motor 2 above is provided. The MG-ECU 13 is configured of a microcomputer as a main unit. The MG-ECU 13 is configured to perform computing in accordance with input data and data and a program that are stored in advance, and output the computing result (e.g. torque) to the power supply device 3 as a control command signal. The data (detection signal) input to the MG-ECU 13 includes the depression angle (accelerator pedal operation amount) of the pedal 12 described above and a rotational speed detected by a rotational speed sensor (e.g. resolver (not illustrated)) provided for the motor 2, etc.

Further, an electronic control unit (B-ECU) 14 that controls the braking force generated by the brakes 8r to 9l is provided. Similar to the MG-ECU 13 as described above, the B-ECU 14 is configured of a microcomputer as a main unit. The B-ECU 14 is configured to perform computing in accordance with input data and data and a program that are stored in advance, and output the computing result (e.g. a hydraulic pressure for braking) to the brakes 8r to 9l as a control command signal. Further, the B-ECU 14 includes a function as an anti-lock braking system (ABS). Therefore, detection signals from the sensors 10r, 10l, 11r, 11l that detect the wheel speeds as described above are input to the B-ECU 14. The ABS calculates a vehicle body speed based on the wheel speeds of the wheels 5r to 6l, calculates the slip ratios of the wheels 5r to 6l based on a deviation between the vehicle body speed and the respective wheel speeds, determines the tendency of locking of the wheel having the slip ratio that increases when the slip ratio increases, and reduces the braking force to eliminate the tendency of locking of the wheel, that is, causes the rotational speed of the wheel to become a target wheel rotational speed obtained based on the vehicle body speed. The B-ECU 14 and the MG-ECU 13 are connected to each other in such a manner that the data is communicable therebetween so as to transmit the target wheel rotational speed.

Figure 2:
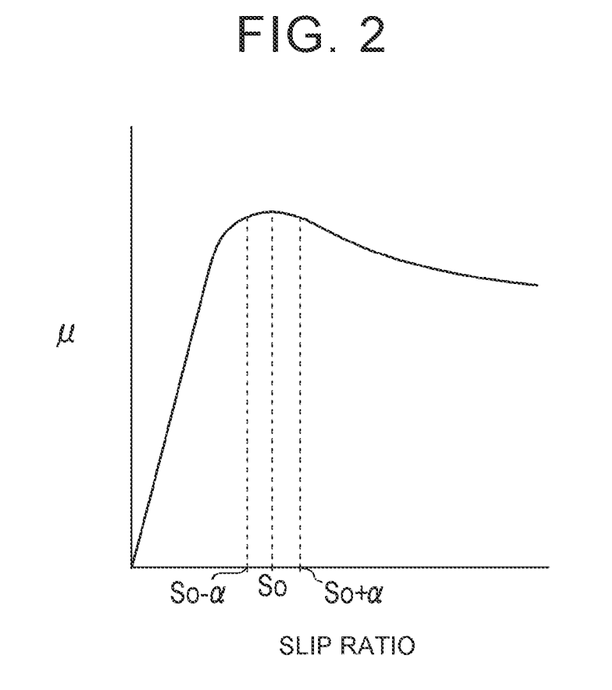
FIG. 2 is a line diagram showing a relationship between a slip ratio and a friction coefficient.

When a braking request is made by, for example, returning the pedal 12 from the depressed state, while the vehicle 1 is traveling, regenerative braking by the motor 2 is performed. This is to improve a braking performance in addition to enhancement of an energy efficiency by regenerating energy. The braking performance is improved as a friction coefficient μ between the wheels and a road surface is larger, which reduces a braking distance. The friction coefficient μ changes in accordance with the slip ratio of the wheel, and a relationship between the friction coefficient μ and the slip ratio is typically as shown in FIG. 2. Here, the slip ratio is a value indicating the degree of slippage of the wheel with respect to the road surface, and the formula is as follows: slip ratio={1−(wheel speed/vehicle body speed)}× 100(%). As shown in FIG. 2, the friction coefficient μ increases rapidly as the slip ratio increases from zero, reaches the maximum at a predetermined value S0, and then gradually decreases as the slip ratio increases. Therefore, normally, the braking force (or the wheel speed) is controlled such that the slip ratio falls within a predetermined range (a range between S0−α and S0+α in FIG. 2) with the predetermined value S0 at which the friction coefficient μ becomes maximum as the center. The motor 2 that generates the regenerative braking force can electrically control torque, and thus control responsiveness of the motor 2 is high. Therefore, in the embodiment of the present disclosure, to change the braking force to follow the friction coefficient μ that varies time to time, the regenerative braking by the motor 2 is performed when a braking request is made, and the braking force is agilely changed based on the slip ratio (wheel speed).

Figure 3:
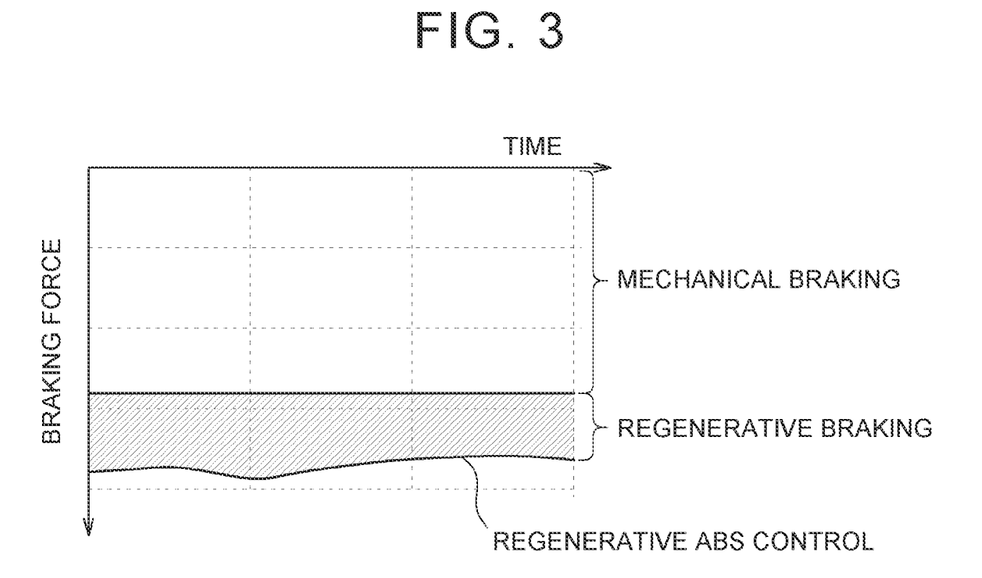
FIG. 3 schematically shows a relationship between a mechanical (friction) braking by friction brakes and regenerative braking.

It should be noted that the regenerative braking force (regenerative torque) that can be generated by the motor 2 has its limit, and the magnitude of the regenerative braking force needs to be changed in accordance with a change in the slip ratio (wheel speed). The maximum regenerative force thus cannot be kept generated. Accordingly, when a required braking force is large, generation of the required braking force is split to cause the friction type brakes $8r$, $8l$, $9r$, $9l$ to generate most of the required braking force, and the motor 2 to generate the remaining braking force. The portion of the braking force that is generated by the friction type brakes as described above corresponds to a basic friction braking force in the embodiment of the present disclosure. On the contrary, when the required braking force is small, the braking by the brakes $8r$, $8l$, $9r$, $9l$ is basically not performed, and only the regenerative braking by the motor 2 is performed. FIG. 3 schematically shows a relationship between a mechanical (friction) braking by the friction brakes and the regenerative braking.

In the vehicle 1 described above, the regenerative braking by the motor 2 is performed by causing the negative torque (torque in a direction to stop rotations of the wheels $5r$, $5l$) resulted from the motor 2 functioning as a power generator to act on the right and left wheels $5r$, $5l$ via the differential gear 4. Therefore, when the friction coefficient $\mu$ is different between the right and left wheels $5r$, $5l$, a differential action is generated by the differential gear 4, and the regenerative braking force acts on the wheel $5r$ (or $5l$) having a smaller friction coefficient $\mu$ but does not act on the wheel $5l$ (or $5r$) having a larger friction coefficient $\mu$. When such a condition arises, the function as an anti-lock brake using the regenerative braking force having a superior responsiveness cannot be exerted. Therefore, in the embodiment of the present disclosure, the vehicle 1 is configured to execute the control described below to eliminate or suppress an effect caused by the differential action of the differential gear 4 to improve the braking performance.

Figure 4:
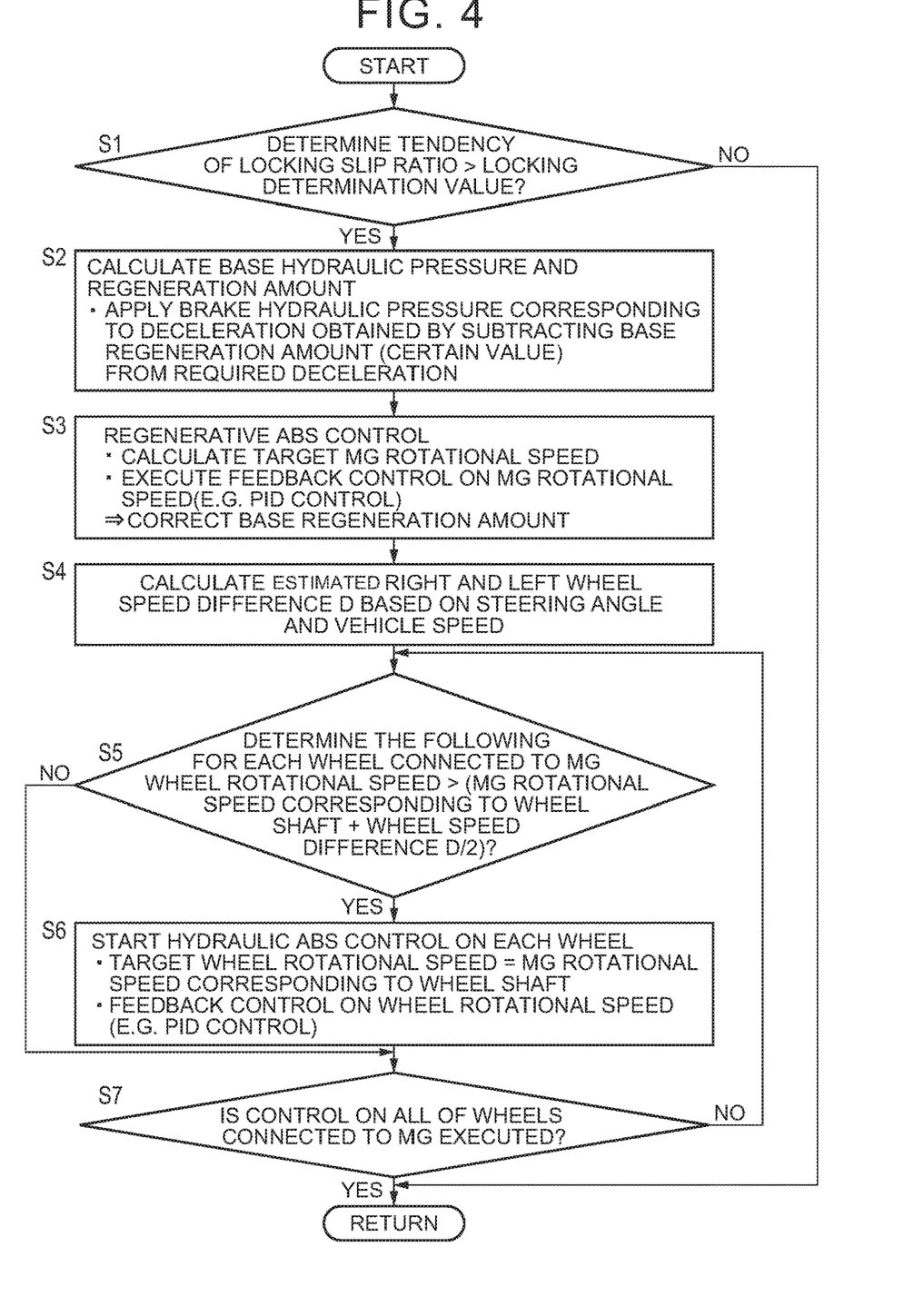
FIG. 4 is a flowchart for illustrating an example of a control executed in an embodiment of the present disclosure.

FIG. 4 is a flowchart for describing an example of the control, and the flowchart is executed by the MG-ECU 13 or the B-ECU 14 described above. Therefore, the ECUs 13 and 14 correspond to the controller in the embodiment of the present disclosure. A routine shown in FIG. 4 is started in the state where the vehicle 1 is traveling, and first of all, the tendency of locking of the wheels is determined (step S1). In other words, the ECU 13 or 14 detects the wheel having the tendency of locking.

The control executed herein is a control of the regenerative braking force. The wheels subject to the determination of the tendency of locking are thus the right and left paired wheels $5r$, $5l$ that are connected to the motor 2 via the differential gear 4. That is, the wheels subject to the determination of the tendency of locking are drive wheels. Specifically, the determination of the tendency of locking can be performed by determining whether the slip ratio is more than a locking determination value. The slip ratio can be obtained based on the wheel speed and the vehicle body speed as described above. The locking determination value may be specified in advance in terms of design. For example, among the values that define the range of the slip ratio as shown in FIG. 2, the upper limit value $S0+\alpha$ may be adopted. Alternatively, a value that is slightly smaller than or slightly larger than the upper limit value $S0+\alpha$ may be adopted. Further, the determination of the tendency of locking may be performed simultaneously in parallel for all the wheels, or the tendency of locking of the wheels $5r$, $5l$, $6r$, $6l$ may be determined in order in accordance with a predetermined sequence.

When a negative determination is made in step S1 based on that any wheel is not detected to have the tendency of locking, the routine shown in FIG. 4 is terminated without executing the control. On the contrary, when a positive determination is made in step S1 based on that there is the wheel having the tendency of locking, a base hydraulic pressure and a regeneration amount are calculated (step S2). The regenerative braking force is generated by regenerating the energy by the motor 2. The magnitude of the regenerative braking force is changed such that the wheel speed due to a change in the friction coefficient $\mu$ matches a target wheel speed (rotational speed). Therefore, a value having a margin of the change is set as a basic regenerative braking force. The "basic regenerative braking force" corresponds to a base braking force in the embodiment of the present disclosure.

On the other hand, deceleration that is required at that time is calculated based on a return angle of the pedal 12 and the speed of returning, or the depression angle and a tread force of a brake pedal when the brake pedal is provided. The braking force generated by the brakes $8r$ to $9l$ (base friction braking force) and its corresponding hydraulic pressure can be obtained by subtracting the regenerative braking force (base braking force) from the braking force that corresponds to the required deceleration. Accordingly, when the required deceleration is small, there may be a case where deceleration that is sufficient and necessary can be performed only by the regenerative braking force by the motor 2. A base hydraulic pressure obtained as above, that is, a brake hydraulic pressure that generates the deceleration obtained by subtracting the portion of deceleration achieved by the regenerative braking from the required deceleration is applied to the brakes $8r$ to $9l$.

The control of the brake hydraulic pressure in step S2 may be similar to or the same as a normal brake control. Therefore, the control in step S2 may be executed by a brake system that is separately provided, and the brake hydraulic pressure obtained by the separate brake system may be read in step S2.

Next, a regenerative ABS control is executed (step S3). The total braking force of the vehicle 1 is a sum of the regenerative braking force by the motor 2 and the braking force by the brakes $8r$, $8l$, $9r$, $9l$, and the regenerative braking force is controlled so as to change the total braking force in accordance with the slip ratio. The reason for the above is that the control responsiveness of the motor 2 is superior. That is, the control above is a control for adjusting the regenerative braking force in order to control the total braking force to avoid locking of the wheels. As described above, it is preferable that the friction coefficient $\mu$ falls within the range indicated by the signs $S0-\alpha$ and $S0+\alpha$ in FIG. 2. Therefore, the slip ratio is controlled such that the friction coefficient $\mu$ falls within the range. Accordingly, the target wheel rotational speed is set to a rotational speed at which the slip ratio of the corresponding wheel falls within the range above, and the rotational speed of the wheel and the braking force are controlled to achieve the target wheel rotational speed.

The slip ratio is calculated based on the wheel speed and the vehicle body speed as described above, and the wheel speed changes in accordance with the braking force. The braking force is thus controlled such that the slip ratio falls within the range above. In the regenerative ABS control, the control of the braking force as described above is executed by controlling the regenerative braking force by the motor 2, that is, the negative torque by the motor 2. The target wheel speed based on the braking request is calculated based on the vehicle body speed at the time when the braking request is made and the target slip ratio. A motor rotational speed corresponding to the target wheel speed (target MG rotational speed) is calculated based on the wheel speed and a reduction ratio between the motor 2 and the wheels 5r, 5l. In step S3, the target MG rotational speed is calculated as described above. A feedback control (FB control) such as a PID control is executed on the motor 2 such that the actual rotational speed matches the target MG rotational speed. The control above changes the torque and the rotational speed of the motor 2, and the base regeneration amount set in step S2 above is corrected in the feedback (FB) control.

Further, an estimated value of a wheel speed difference D between the right and left wheels (step S4). A wheel speed deviation between the right and left wheels 5r, 5l is generated by a difference between the inner wheel and the outer wheel when the vehicle 1 is making a turn, in addition to a difference in the slip ratio between the right and left wheels 5r, 5l. The wheel speed difference D between the right and left wheels is calculated in step S4 to avoid an effect by the wheel speed difference D caused by the difference between the inner and outer wheels. The wheel speed difference D between the right and left wheels is caused because a turning radius of each of the wheels 5r, 5l when the vehicle 1 is making a turn is different from each other. The wheel speed difference D between the right and left wheels can thus be obtained based on a steering angle and the vehicle speed at that time. In this case, in a four-wheel steering vehicle in which the steering angle can be changed between the front wheels and the rear wheels, the turning radius of each wheel is obtained using the steering angle of the front wheels and the steering angle of the rear wheels, and the wheel speed difference D is estimated (calculated) based on the obtained turning radius and the vehicle speed. Therefore, when a steering operation is not performed, the wheel speed difference D is "0". Note that, calculation of the estimated value of the wheel speed difference D between the right and left wheels may not necessarily be performed continuously after step S3 above. The data calculated by other control system such as a steering control system and an anti-lock system may be read, and such reading of data may be performed sequentially to use the read data on an as-needed basis.

Whether the rotational speed of any of the wheels increases in accordance with execution of the regenerative ABS control in step S3 is determined (step S5). In the vehicle 1 shown in FIG. 1, the right and left wheels 5r, 5l that receive torque from the motor 2 are connected via the differential gear 4 that is the differential mechanism. Therefore, when the rotational speed of one wheel 5r (or 5l) decreases while the vehicle 1 is traveling, the rotational speed of the other wheel 5l (or 5r) increases. The reason for the above is that the differential gear 4 is a mechanism in which an average value of the right and left output rotational speeds is used as an input rotational speed. Therefore, in step S5, a determination is made whether the wheel rotational speed of each of the wheels 5r, 5l that are connected to the motor 2 is higher than a rotational speed obtained by adding a half (D/2) of the wheel speed difference D described above to a wheel shaft rotational speed of the motor (MG) 2. The wheel shaft rotational speed is an MG wheel shaft rotational speed that is determined based on the rotational speed of the motor 2 and the reduction ratio between the motor 2 and wheels 5r, 5l. Accordingly, in step S5, a determination is made whether the wheel shaft rotational speed is higher than the wheel shaft rotational speed of the motor (MG) 2 because the wheel speed difference D between the right and left wheels is "0" when the vehicle 1 is traveling straight.

For example, when the friction coefficient μ decreases on the left wheel 5l side, the torque that rotates the wheel by the inertia force generated by the vehicle 1 traveling decreases for the left wheel 5l. The rotational speed of the left wheel 5l decreases due to the regenerative braking force and the braking force (friction braking force). In this case, the left wheel 5l side generates more regenerative braking force as the rotational speed of the left wheel 5l decreases, and thus the regenerative braking force on the right wheel 5r side decreases because the regenerative braking force is split and transferred to the right and left wheels 5r, 5l via the differential gear 4. As a result, because the entire braking force of the right wheel 5r decreases, the right wheel 5r is further rotated by the inertia force of the vehicle 1, and the rotational speed of the right wheel 5r increases. The state similar to the above also arises when the rotational speed of the right wheel 5r decreases. In this case, the rotational speed of the left wheel 5l increases. In step S5, whether the state as described above arises is determined. The determination above may be made, instead of determining whether the wheel rotational speed is larger than the MG wheel shaft rotational speed, by determining whether a difference between the wheel rotational speed and the MG wheel shaft rotational speed is larger than a reference value.

Figure 5:
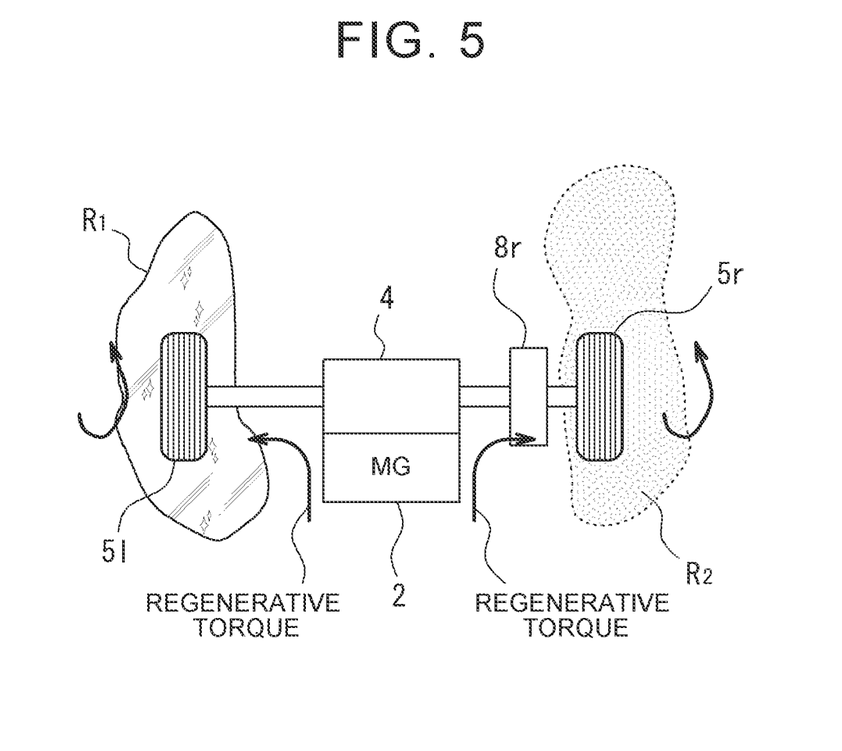
FIG. 5 is a diagram schematically showing a regenerative torque transmission state and a braking state by the friction brakes when braking is performed in a state where right and left wheel fiction coefficients are different from each other.

When the positive determination is made in step S5, the hydraulic ABS control for each wheel is started (step S6). The hydraulic ABS control is an anti-lock brake control by the friction type brakes 8r to 9l, and controls the braking force of the brakes 8r to 9l, that is, the hydraulic pressure such that the rotational speed of the target wheel matches the target wheel rotational speed. The target wheel herein is a wheel having the regenerative braking force that decreases due to the differential action by the differential gear 4 (or to which the regenerative braking force is not distributed), and is any one of the paired wheels 5r, 5l that are connected to each other via the differential gear 4. In other words, the target wheel is a wheel on which the regenerative braking force does not act due to an effect of the differential action of the differential gear 4, and corresponds to "other wheel" in the embodiment of the present disclosure. FIG. 5 schematically shows the above. While braking, the left wheel 5l runs on a road surface R1 having a small friction coefficient μ, such as a compacted snow road, and the right wheel 5r runs on a road surface R2 having a larger friction coefficient μ than that of the left wheel 5l. As a result, when the rotational speed of the left wheel 5l decreases and thus the left wheel 5l has so-called tendency of locking, the hydraulic ABS control above is executed on the brake 8r of the right wheel 5r that forms a pair with the left wheel 5l.

The target wheel rotational speed of each of the wheels 5r, 5l in the state where braking is performed using the motor 2 and the brakes 8r to 9l is determined based on the vehicle body speed and the target friction coefficient μ. The target wheel rotational speed may be the MG wheel shaft rotational speed described above. Therefore, in step S5, the hydraulic pressure of the brake provided for the wheel having the rotational speed above being higher than the MG wheel shaft rotational speed is controlled through the feedback control (FB control; PID control for example) such that the rotational speed of the wheel matches the MG wheel shaft rotational speed. As a result, when the slip ratio increases and it is determined that there is the tendency of locking, the braking force of the brake provided for the other wheel that forms via the differential gear 4 a pair with the wheel of which tendency of locking is determined is changed so as to reduce or eliminate the tendency of locking.

It is determined whether the regenerative ABS control and the hydraulic ABS control described above are executed for all of the wheels 5r, 5l that are connected to the motor 2 via the differential gear 4 (step S7). Step S7 is a control step that assumes the case where there is a plurality of the wheels having the tendency of locking. The plurality of wheels may have the tendency of locking depending on the configuration of the vehicle 1. When the negative determination is made in step S7, the routine returns to step S5 described above, and the controls in step S5 and step S6 are executed. When the positive determination is made in step S7, on the contrary, the routine returns. When the negative determination is made in step S5 described above, the routine proceeds to step S7 to make a determination on the rotational speed of the other wheel. In this case, when the wheel of which rotational speed is determined in step S4 is the last wheel for determining the rotational speed, the positive determination is made in step S7. Therefore, the routine shown in FIG. 4 is terminated.

Figure 6:
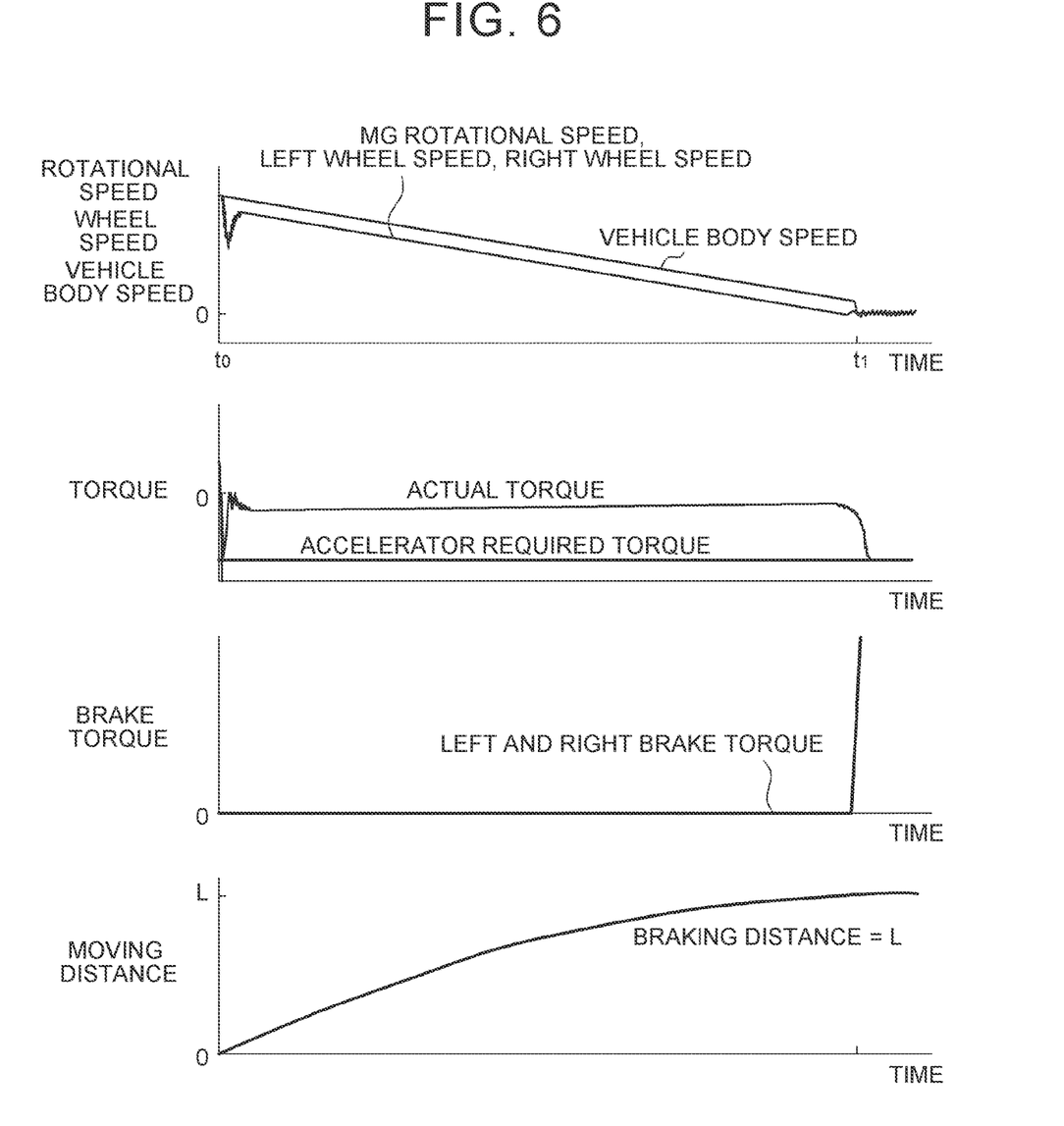
FIG. 6 is a line diagram showing an example of changes in a motor rotational speed, a wheel speed, a vehicle body speed, braking torque, brake torque by the friction brakes, and a moving distance (braking distance) from the start of braking to stop of a vehicle when braking is performed on a so-called low friction coefficient road on which the right and left wheel friction coefficients are the same.
Figure 7:
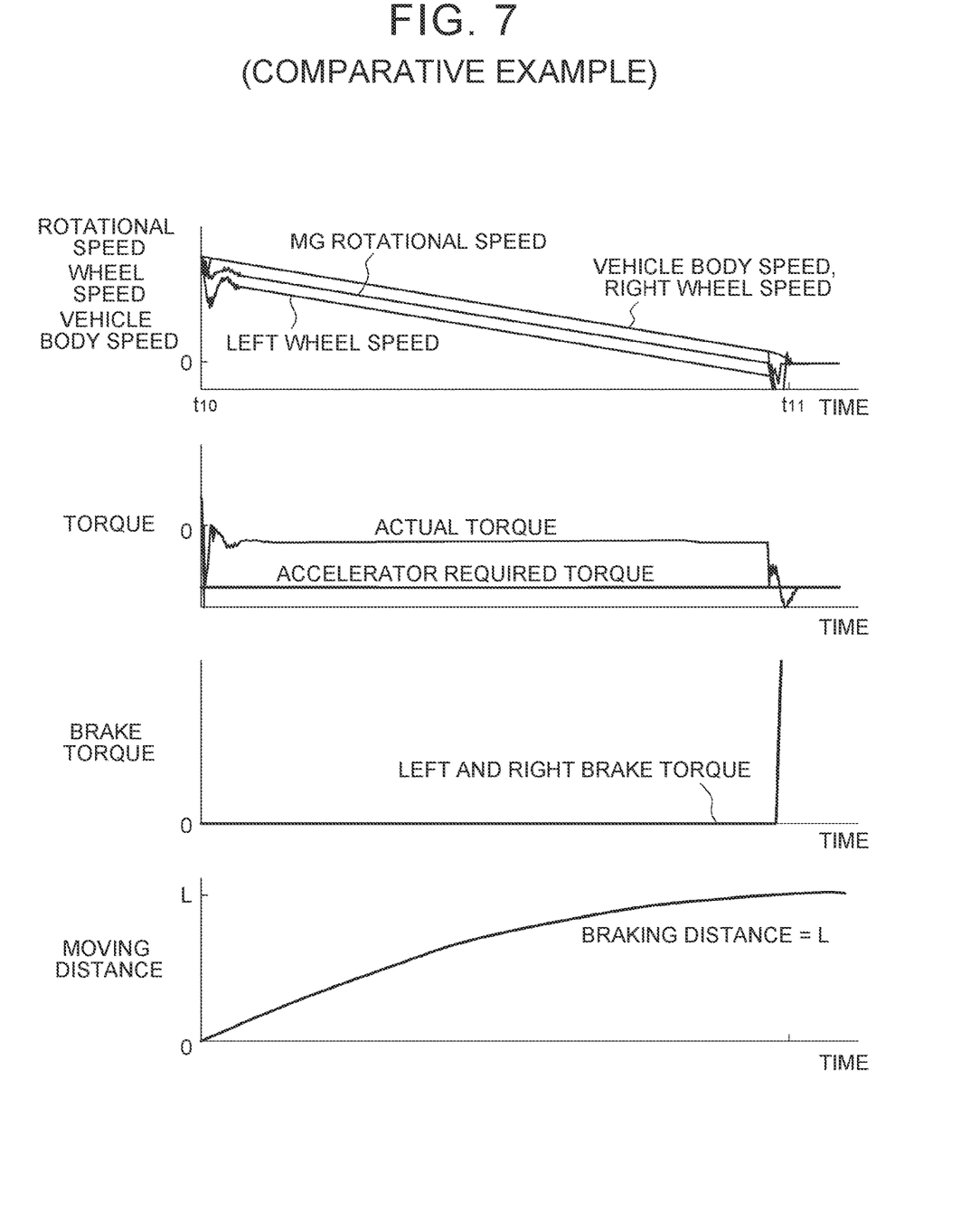
FIG. 7 is a line diagram showing an example of changes in the motor rotational speed, the wheel speed, the vehicle body speed, the braking torque, the brake torque by the friction brakes, and the moving distance (braking distance) from the start of braking to the stop of the vehicle when braking is performed in a state where the left wheel runs on an iced road and the right wheel runs on a compacted snow road (comparative example)
Figure 8:
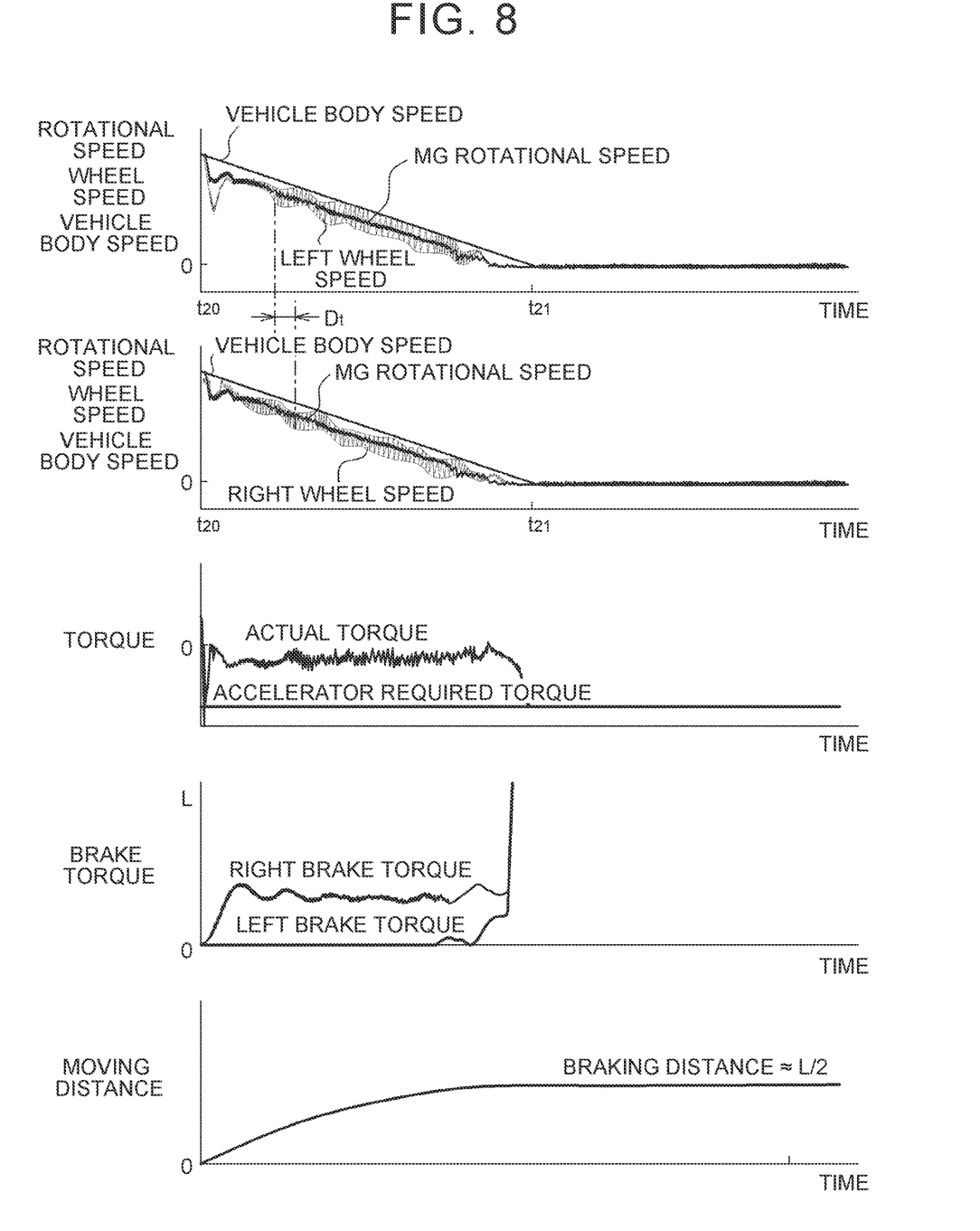
FIG. 8 is a line diagram showing an example of changes in the motor rotational speed, the wheel speed, the vehicle body speed, the braking torque, the brake torque by the friction brakes, and the moving distance (braking distance) from the start of braking to the stop of the vehicle when a control according to the present disclosure is executed during braking in the state where the left wheel runs on the iced road and the right wheel runs on the compacted snow road.

The result of simulation performed to confirm the actions and effects of the embodiment of the present disclosure will be described. The motor rotational speed (MG rotational speed), the wheel speed, the vehicle body speed, the braking torque, the brake torque by the friction brakes, and a moving distance (braking distance) from the start of braking to the stop of the vehicle 1 are measured for the case where the right and left road surfaces have the same friction coefficient μ and the case where the right and left road surfaces have different friction coefficients μ from each other. In FIGS. 6, 7, and 8 below, the base friction brake torque is omitted and is set to "0".

FIG. 6 shows an example of the case where the braking is performed on a road surface having the friction coefficient μ that is small and uniform, similar to that on an iced road, and shows only the regenerative braking because the required deceleration is not particularly large. In FIG. 6, a braking request is made at the time point t0 by returning the pedal 12 from the depressed state, etc., and the rotational speed of the motor 2 (MG rotational speed) decreases in accordance with the braking request. In other words, the regenerative braking force is generated by the motor 2 and the rotational speeds of the right and left wheels 5r, 5l temporarily decrease. The rotational speeds are then maintained so as to avoid locking. Therefore, the MG rotational speed and the wheel speeds of the right and left wheels 5r, 5l are maintained to be lower than the vehicle body speed to some extent and gradually decrease in a manner similar to the vehicle body speed.

An actual torque (braking torque) in this process is not as small (is not large in a negative direction) as the torque required by the pedal operation (accelerator required torque) because the friction coefficient μ of the road surface is small, and is maintained to be a small torque to the extent that locking of wheels does not occur (small torque in the negative direction). Further, the friction coefficient μ is the same between the right and left sides of the vehicle 1, and the friction coefficient μ is small. Therefore, the braking torque (brake torque) of the brakes 8r, 8l is zero. That is, the braking by the brakes 8r, 8l is not performed. As described above, the regenerative ABS control by the motor 2 is executed, and the vehicle body speed becomes zero at the time point t1, which stops the vehicle 1. The brake torque is increased up to a predetermined upper limit value so as to maintain the state where the vehicle 1 is stopped. The distance from the start of braking to the stop of the vehicle 1 (braking distance) is L meters.

FIG. 7 shows an example of the case where one of the right and left paired wheels 5r, 5l (for example, the right wheel 5r) runs on the compacted snow road, the other wheel (for example, the left wheel 5l) runs on the iced road having a smaller friction coefficient μ than that of the compacted snow road, and braking is performed in the state where the right and left friction coefficients μ are different from each other and the brake control to eliminate or suppress the effect by the differential action of the differential gear 4 is not executed during the braking. Therefore, FIG. 7 shows a comparative example.

In FIG. 7, a braking request is made by the pedal 12 returning from the depressed state, etc. at the time point t10 while the vehicle is traveling, the motor 2 functions as the generator and generates the regenerative braking. That is, similar to the example shown in FIG. 6 described above, the rotational speeds of the motor 2 and the right and left wheels 5r, 5l are maintained to be lower than the vehicle body speed after temporarily greatly decreasing, and then gradually decrease together with the vehicle body speed. In that case, the torque that is rotated by the inertia force of the vehicle 1 becomes smaller for the left wheel 5l having a small friction coefficient Therefore, the rotational speed of the left wheel 5l becomes smaller than that of the right wheel 5r. That is, the left wheel 5l has the tendency of locking. The regenerative braking force by the motor 2 does not act on the right wheel 5r due to the differential action of the differential gear 4, and the rotational speed of the right wheel 5r changes in synchronization with the vehicle body speed. The rotational speed of the motor 2 (wheel shaft rotational speed) gradually decreases in accordance with a decrease in the vehicle body speed while maintaining a value of the rotational speed between the wheel speeds of the right and left wheels. Therefore, a tendency of decrease is similar to that of the normal condition shown in FIG. 6.

When the vehicle body speed approaches zero, the wheel speed of the left wheel 5l becomes zero prior to that. Because the vehicle body speed is still generated at that time, the motor 2 is controlled in a direction to increase the regenerative braking force. As a result, the left wheel 5l rotates in a reverse direction, and the wheel speed of the right wheel 5r increases in accordance with the reverse rotation of the left wheel 5l. A so-called temporary disturbance of the wheel speed occurs and then the vehicle body speed is reduced to zero (at the time point t11), which stops the vehicle 1. The brake torque is increased up to the predetermined upper limit so as to maintain the state where the vehicle 1 is stopped. The distance from the start of braking to the stop of the vehicle 1 (i.e. braking distance) is L meters. The accelerator required torque, the actual torque, and the brake torque of the brakes 8r, 8l provided for the wheels 5r, 5l, respectively, are similar to those shown in the example of FIG. 6. As a result, in the comparative example shown in FIG. 7, even if the regenerative ABS control is executed, the regenerative braking force by the motor 2 does not act on the wheel 5r having a larger friction coefficient μ due to the differential action of the differential gear 4. Therefore, the braking distance is not reduced.

FIG. 8 shows an example of the embodiment of the present disclosure. Note that, in FIG. 8, a line indicating the wheel speed of the right wheel 5r and a line indicating the wheel speed of the left wheel 5l are drawn separately from each other to avoid the lines to overlap each other, making the lines difficult to view. The friction coefficient μ of the road surface in the example of FIG. 8 is similar to that in the example shown in FIG. 7. One of the right and left paired wheels 5r, 5l (for example, the right wheel 5r) runs on the compacted snow road, and the other wheel (for example, the left wheel 5l) runs on the ice road, for example, having a smaller friction coefficient μ than that of the compacted snow road. The friction coefficients μ of the right and left wheels are different from each other. When a braking request is made while the vehicle 1 is traveling on the road surface described above, the motor 2 enters a regenerative state and generates the braking torque (at the time point t20). As a result, the right and left wheel speeds decrease. However, because the friction coefficient μ is small on the left wheel 5*l* side, the wheel speed of the left wheel 5*l* greatly decreases. That is, the left wheel 5*l* has the tendency of locking. Along with the above, the wheel speed of the right wheel 5*r* having a larger friction coefficient μ, than that of the left wheel 5*l* becomes larger than that of the left wheel 5*l* due to the differential action of the differential gear 4. That is, the regenerative braking force does not act on the right wheel 5*r*, or the regenerative braking force of the right wheel 5*r* becomes small.

The control device in the embodiment of the present disclosure executes the hydraulic ABS control on each of the wheels 5*r*, 5*l*, as described with reference to FIG. 4. Therefore, when the wheel speed of the right wheel 5*r* increases as described above, the hydraulic ABS control is executed on the right wheel 5*r*. The hydraulic ABS control is a control to change the braking force such that the rotational speed of the wheel matches the target wheel rotational speed. As described above, when the left wheel 5*l* has the tendency of locking and the rotational speed (wheel speed) of the right wheel 5*r* becomes larger than the target wheel rotational speed, the braking force (hydraulic pressure) of the brake 8*r* is increased so as to reduce the rotational speed of the right wheel 5*r*. As shown in FIG. 8, the brake torque of the right wheel 5*r* is increased while the brake torque of the left wheel 5*l* is maintained to be zero. The control above is feedback control (FB control) of a brake hydraulic pressure with a difference between the actual rotational speed and the target wheel rotational speed of the right wheel 5*r* as a control deviation.

The hydraulic ABS control for the wheel having a larger friction coefficient μ (right wheel 5*r*) is executed when it is determined that the wheel having a smaller friction coefficient μ (left wheel 5*l*) has the tendency of locking, and further, the hydraulic ABS control is a hydraulic control. Therefore, the rotational speed of the right wheel 5*r* is decreased with a delay from a decrease in the wheel speed of the left wheel 5*l* (determination on the tendency of locking). The regenerative braking force then starts to be applied to the right wheel 5*r* of which rotational speed is decreased, and the regenerative braking force applied to the left wheel 5*l* is reduced in accordance with the above. Therefore, the rotational speed of the left wheel 5*l* increases, which eliminates the tendency of locking.

As described above, when the hydraulic ABS control is executed on the wheel to which the regenerative braking force is not applied due to an effect by the differential action of the differential gear 4, the brake torque from the hydraulic ABS control affects the wheel speeds and the regenerative braking force of the right and left wheels 5*r*, 5*l*, and the rotational speeds of the wheels 5*r*, 5*l* slightly and repeatedly change. Therefore, in FIG. 8, the line indicating each of the wheel speeds is shown as a wide wavy line, and the wheel speed pulsates within the width range of the wide line. Note that, in FIG. 8, the state of pulsation is shown by lines with a wider pitch in order to avoid hiding the line indicating the MG rotational speed. As can be seen from FIG. 8, the wheel speed of the right wheel 5*r* changes with a delay of about a half interval Dt with respect to the change of the wheel speed of the left wheel 5*l* having a smaller friction coefficient μ.

As described above, the hydraulic ABS control is the feedback control with the rotational deviation as the control deviation. Therefore, the hydraulic pressure repeatedly changes up and down. Accordingly, the actual torque (braking torque) as the entire vehicle 1 including the braking force by the brake 8*r* that is hydraulically controlled slightly and repeatedly changes as shown by the wide and wavy line in FIG. 8.

The tendency of locking of the wheel having a smaller friction coefficient μ (left wheel 5*l*) is reduced or eliminated by executing the hydraulic ABS control on the wheel (right wheel 5*r*) of which rotational speed (wheel speed) increases due to the differential action of the differential gear 4, as described above. As a result, the friction coefficient μ of the right wheel 5*r* increases as the slip ratio is reduced. At the same time, the slip ratio of the right wheel 5*r*, which has been reduced as the rotational speed increases, increases by reducing the rotational speed (wheel speed) toward the target wheel rotational speed, and the friction coefficient μ increases toward the maximum value in accordance with the increase in the slip ratio. As descried above, the braking force is controlled such that the friction coefficient μ between the road surface and the right and left wheels 5*r*, 5*l* increases as much as possible. Therefore, the moving distance (braking distance) from the time when the vehicle body speed becomes zero to the time when the vehicle 1 stops (at the time point t21) is significantly reduced, that is, reduced to about a half (L/2), compared to the braking distance L in the normal operation shown in FIG. 6 or the braking distance L in the case where the control in the embodiment of the present disclosure is not executed.

The present disclosure is not limited to the embodiment described above, and the vehicle of the present disclosure may be a hybrid vehicle including an internal combustion engine and a motor (motor-generator) as the driving force source, or may be a vehicle including the internal combustion engine as the driving force source. Further, the braking force generator connected to the right and left wheels via the differential mechanism may be a power generator that is provided for the purpose of energy regeneration only, or may be a device that generates the braking force without regenerating energy, in addition to the motor-generator that generates the driving force to cause the vehicle to travel. Further, the differential mechanism may be any other gear mechanism having other configurations, such as a planetary gear mechanism, in addition to the gear mechanism in which a pinion gear is interposed between a right and left pair of side gears and meshes with the side gears. Furthermore, the vehicle to which the present disclosure applies may be a four-wheel-drive (all-wheel-drive) vehicle in which the driving force source having an energy regeneration function is connected to the differential gears on the right and left sides at the front and the rear of the vehicle by transfers having the differential action. The control device of the present disclosure may be configured to control the braking force or the rotational speed of either of the front or rear wheels using the friction brakes so as to suppress an effect by the differential action of the transfer.

What is claimed is:

1. A braking control device of a vehicle in which a braking force generator that generates a braking force that acts in a direction to reduce a rotation of a plurality of wheels is connected to a differential mechanism to which the plurality of wheels is connected, and a friction brake that generates a braking force that acts in a direction to stop the rotation of the wheels through friction is provided for each of the wheels, the braking control device comprising a controller configured to control the braking force that is generated by the braking force generator and the braking force that is generated by the friction brake, wherein the controller is configured to:

detect the wheel having a tendency of locking in which a slip ratio is larger than a predetermined determination value in a state where the braking force is transmitted to each of the wheels from the braking force generator via the differential mechanism;

reduce the tendency of locking by changing the braking force of the friction brake that is provided for the other wheel connected to the differential mechanism to which the wheel having the tendency of locking is connected; and wherein the braking force generator is an energy regenerator that generates negative torque by regenerating an energy as the braking force.

2. The braking control device according to claim 1, wherein the controller is configured to:

obtain a target wheel rotational speed of the other wheel; and control the braking force applied to the other wheel by the friction brake that is provided for the other wheel such that a rotational speed of the other wheel matches the target wheel rotational speed.

3. The braking control device according to claim 2, wherein when the vehicle is making a turn, the target wheel rotational speed is a rotational speed including a value that is a half of a right and left wheel speed difference obtained based on a steering angle and a vehicle speed of the vehicle.

4. The braking control device according to claim 2, wherein the target wheel rotational speed of the other wheel is a rotational speed at which the slip ratio of the other wheel takes a value within a predetermined range.

5. The braking control device according to claim 1, wherein the controller is configured to:

obtain, when a deceleration request is made, a base friction braking force that is required to be generated by the friction brake by subtracting a predetermined base braking force to be generated by the braking force generator from a required deceleration of the deceleration request;

obtain a target rotational speed of the braking force generator that corresponds to a target wheel speed during braking based on the deceleration request; and correct the base braking force such that a rotational speed of the braking force generator matches the target rotational speed.

6. The braking control device according to claim 5, wherein the controller is configured to control, when a wheel speed of one of the wheels connected to the differential mechanism increases in excess by a predetermined value or more from a wheel speed that corresponds to a target wheel rotational speed in accordance with the correction of the base braking force, the braking force of the friction brake that is provided for the one of the wheels such that the wheel speed of the one of the wheels matches a wheel speed that corresponds to the target wheel rotational speed.

7. The braking control device according to claim 1, wherein the controller calculates a vehicle body speed based on a wheel speed of each of the wheels;

calculates the slip ratios of each of the wheels based on a deviation between the vehicle body speed and the wheel speed of each of the wheels;

determines the tendency of locking of the wheels increases when the slip ratio increases; and reduces the braking force to eliminate the tendency of locking of the wheels, which causes a rotational speed of the wheel to become a target wheel rotational speed obtained based on the vehicle body speed.

8. A braking control device of a vehicle in which a braking force generator that generates a braking force that acts in a direction to reduce a rotation of a plurality of wheels is connected to a differential mechanism to which the plurality of wheels is connected, and a friction brake that generates a braking force that acts in a direction to stop the rotation of the wheels through friction is provided for each of the wheels, the braking control device comprising a controller configured to control the braking force that is generated by the braking force generator and the braking force that is generated by the friction brake, wherein the controller is configured to:

detect the wheel having a tendency of locking in which a slip ratio is larger than a predetermined determination value in a state where the braking force is transmitted to each of the wheels from the braking force generator via the differential mechanism;

reduce the tendency of locking by changing the braking force of the friction brake that is provided for the other wheel connected to the differential mechanism to which the wheel having the tendency of locking is connected;

obtain a target wheel rotational speed of the other wheel;

control the braking force applied to the other wheel by the friction brake that is provided for the other wheel such that a rotational speed of the other wheel matches the target wheel rotational; and wherein when the vehicle is making a turn, the target wheel rotational speed is a rotational speed including a value that is a half of a right and left wheel speed difference obtained based on a steering angle and a vehicle speed of the vehicle.

9. The braking control device according to claim 8, wherein the target wheel rotational speed of the other wheel is a rotational speed at which the slip ratio of the other wheel takes a value within a predetermined range.

10. The braking control device according to claim 8, wherein the braking force generator is an energy regenerator that generates negative torque by regenerating an energy as the braking force.

11. The braking control device according to claim 8, wherein the controller is configured to:

obtain, when a deceleration request is made, a base friction braking force that is required to be generated by the friction brake by subtracting a predetermined base braking force to be generated by the braking force generator from a required deceleration of the deceleration request;

obtain a target rotational speed of the braking force generator that corresponds to a target wheel speed during braking based on the deceleration request; and correct the base braking force such that a rotational speed of the braking force generator matches the target rotational speed.

12. The braking control device according to claim 11, wherein the controller is configured to control, when a wheel speed of one of the wheels connected to the differential mechanism increases in excess by a predetermined value or more from a wheel speed that corresponds to a target wheel rotational speed in accordance with the correction of the base braking force, the braking force of the friction brake that is provided for the one of the wheels such that the wheel speed of the one of the wheels matches a wheel speed that corresponds to the target wheel rotational speed.

13. The braking control device according to claim 8, wherein the controller calculates a vehicle body speed based on a wheel speed of each of the wheels;
- calculates the slip ratios of each of the wheels based on a deviation between the vehicle body speed and the wheel speed of each of the wheels;
- determines the tendency of locking of the wheels increases when the slip ratio increases; and
- reduces the braking force to eliminate the tendency of locking of the wheels, which causes a rotational speed of the wheel to become a target wheel rotational speed obtained based on the vehicle body speed.

\* \* \* \* \*